March 4, 1958  F. O. LUENBERGER  2,825,827
VENTILATED ELECTRIC MOTOR
Filed Feb. 14, 1955
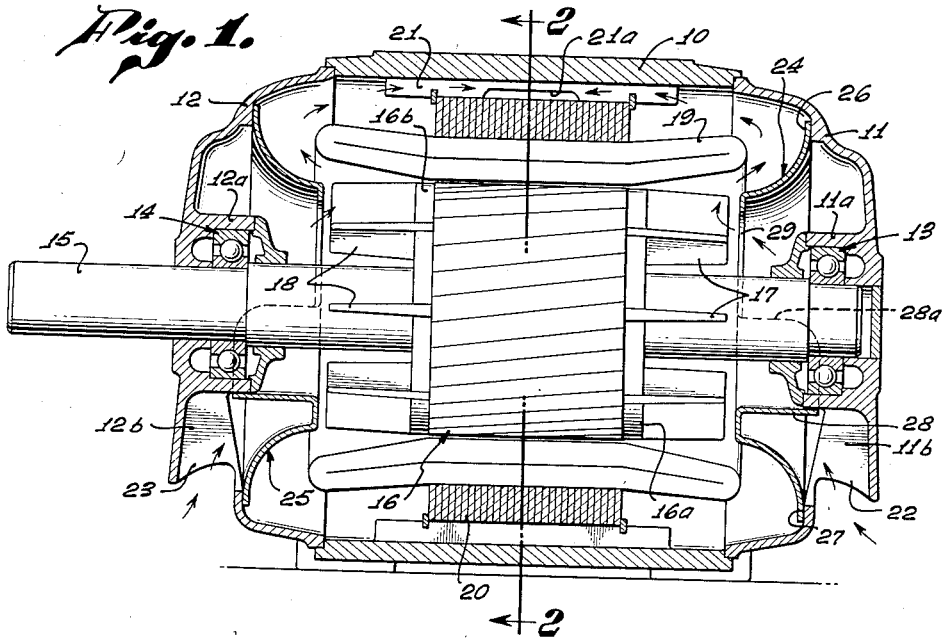
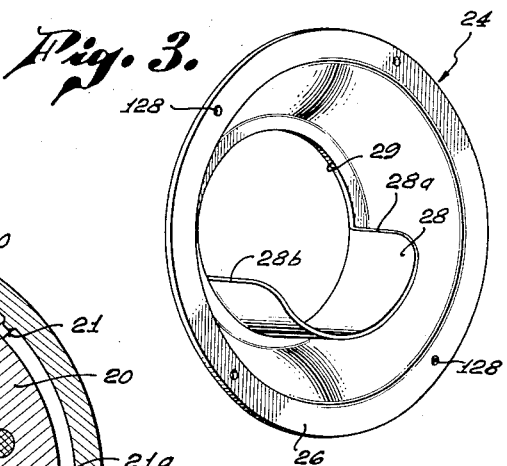
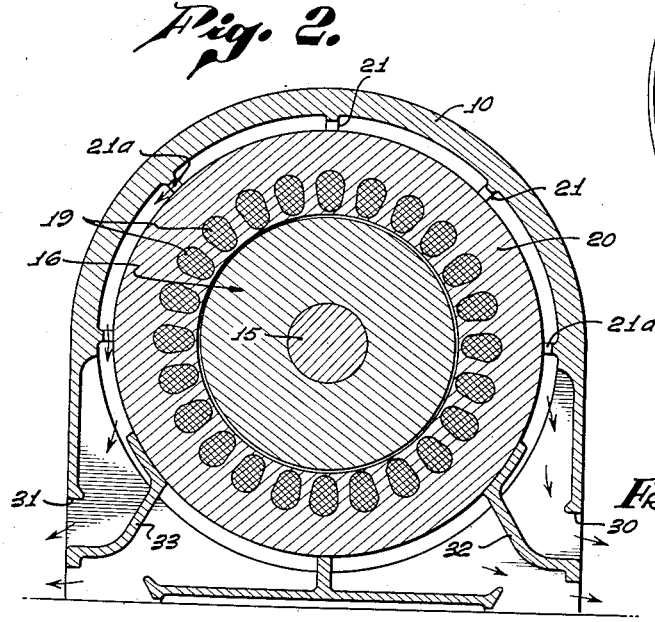
FREDERICK O. LUENBERGER
INVENTOR.
BY Flam and Flam
ATTORNEYS.

United States Patent Office 2,825,827
Patented Mar. 4, 1958

2,825,827
VENTILATED ELECTRIC MOTOR

Frederick O. Luenberger, Los Angeles, Calif., assignor to U. S. Electrical Motors Inc., Los Angeles, Calif., a corporation of California Application February 14, 1955, Serial No. 488,023

7 Claims. (Cl. 310—60)

This invention relates to air ventilated machines, and particularly to electric dynamo-electric machines, such as motors.

In some installations, the motor may be exposed to water. To prevent damage, provisions must be made to ensure against water passing into the motor structure through the ventilating openings. Baffles and deflectors have often been provided in the past. However, such prior structures have been complex and expensive.

It is an object of this invention to provide a simple and improved structure for protecting a motor or the like against entry of water through air ventilation openings.

It is another object of this invention to provide a device of this character that is inexpensive and that obviates intricate castings.

It is another object of this invention to provide a motor protected against entry of water through air ventilation openings making use of an easily assembled part cooperating with a bearing boss of the motor end bracket for defining an appropriate water protected vestibule for entering air.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a longitudinal sectional view of an induction motor incorporating the present invention;

Fig. 2 is a sectional view taken along a plane corresponding to line 2—2 of Fig. 1; and Fig. 3 is a pictorial view of one of the baffle members shown in Figs. 1 and 2.

A motor frame 10 is shown having similar end brackets 11 and 12 at opposite ends, which, together with the frame 10, enclose the operative parts of the induction motor.

The brackets 11 and 12 may be secured in place in any suitable manner.

The brackets 11 and 12 have integrally formed inwardly extending bosses 11a and 12a accommodating ball bearing structures 13 and 14 for rotatably supporting a shaft 15.

The motor includes the rotor 16 suitably mounted on the shaft 15. The rotor has end rings 16a and 16b with which are integrally formed fan blades 17 and 18. The stator of the motor includes the windings or coils 19 disposed in slots in the stacked stator laminations 20. The frame 10 has a series of angularly spaced longitudinally extending ribs 21 accommodating the stator structure, so as to leave an annular air space between stator 20 and frame 10.

Ventilation air is urged by the fan blades 17 and 18 into the motor frame via large vertically downwardly extending openings 22 and 23 formed in the end brackets 11 and 12. Vertical reinforcing ribs 11b and 12b depending from the bearing bosses divide the inlets into two symmetrical halves.

A baffle member 24, 25 is provided for each of the brackets 11 and 12 to define an inlet passage for ventilating air. The baffle members are identical in construction and operation, and only the baffle member 24 will be described in detail.

The baffle member 24, which may be made of sheet metal material, or the like, is generally of conical configuration, having a base flange 26 abutting an annular surface 27 formed on the bracket 11, and held in place by suitable cap screws (not shown) passing through apertures 128 of the flange 26 and threadedly engaging the bracket 11. The baffle member 24 extends inwardly of the bracket, the flange 26 being located inwardly of the air inlet opening 22, so that air entering the bracket 11 through the opening 22 passes into the baffle member 24.

The baffle member 24 has a semi-cylindrical foil or apron 28 extending toward the bearing boss 11a, from the circular edge 29 forming the reduced outlet opening of the baffle member 24. The free end of the apron 28 fits snugly about the lower portion of the surface of the bearing boss 11a, and defines with the reinforcing rib 11b symmetrically disposed short arcuate passages for entering air. Air from opening 22 can pass into the motor structure only after it divides around the foil 28, and passes the lateral edges 28a and 28b of the foil 28, which are located substantially above the upper edges of the opening 22 and approximately at the level of the shaft 15. The foil 28, boss 11a and rib 11b prevent direct passage of air beneath the bearing boss 11a through the baffle member 24.

The edge 29 forming the outlet opening from the baffle member 24 is located quite close the outer edges of the fan blades 17. Air is urged by the fan past the fan blades 17, and heat is transferred from the rotor structure thereby. Thereafter, the air can pass about the ends of the turns of the stator windings 19 and longitudinally through the spaces defined by the exterior surfaces of the stator laminations, the interior surface of the frame 10, and the angularly spaced ribs 21, as indicated by the arrows.

The foil 28 deflects water that might splash upwardly into the bracket opening 22, and either redirects the water outwardly of the opening 22, or against the walls of either of the baffle member 24 or the bracket 11. The rib 11b also serves as a deflector. The water may run off through the opening 22.

The baffle member 24 ensures that there be no straight path between the bracket opening 22 and the interior of the motor. The foil 24 serves effectively to separate water from the entering stream of air.

While the opening 22 is sufficiently above the base plane of the motor to ensure against inducing entrance of dust or other foreign material into the motor, the baffle member 24 provides a cumulative effect in this connection, since the draft must be sufficiently strong to lift the foreign particles over the edges 28a and 28b of the foil or apron 28 before it can enter the motor. The fans, however, induce only a slow, and not too forceful draft of air.

Air exits from the motor through openings on opposite sides of the motor frame 10, sufficiently displaced from the inlet openings to ensure against recirculation of air.

The outlet openings 30 and 31 are each divided by integrally cast partitions 32 and 33 serving to prevent undesired entrance of water. However, the outwardly issuing air at the openings 30 and 31 serves as a substantial measure of assurance against such entry of water.

Air passes to the outlet openings 30 and 31 through recesses 21a provided in the supporting ribs 21, the recesses permitting circumferential movement of air to the outlet openings. However, such recesses are not essential, since air may pass about the end laminations of the stator 20, or otherwise.

The arrows shown in the drawings illustrate generally the path of air circulated through the motor.

The inventor claims:

1. For use in an air ventilated rotary apparatus having a bearing bracket provided with a bearing boss and air inlet openings: a deflector, having a substantially annular portion bounded by two circular edges, one of the edges being adapted to be placed in engagement with the bearing bracket, said deflector having a foil extending from a portion of the other edge and adapted to extend about a portion of said bearing boss to form a vestibule for air entering the bracket opening.

2. For use in an air ventilated rotary apparatus having a wall providing a bearing support projecting internally of the wall and provided with an opening at one side of the support for entrance of air: a deflector comprising a generally conical hollow member having edges forming openings of different sizes at opposite ends, said member having means adjacent the edge forming the larger opening for interiorly attaching the member to the wall in surrounding relationship both to the support and the opening for confining air passing through the opening to a path through the hollow member, and an apron joined to a portion of the edge of the smaller opening and extending inwardly of the conical member for engagement about a portion of the periphery of the bearing support between the support and the opening to form a vestibule for air entering the opening.

3. In combination: a bearing bracket having a flange for attachment to the frame of a rotary machine, said bracket having a bearing boss as well as an opening on one side of the boss, said bracket also having an annular surface between the end of the flange and the opening; a deflector comprising a generally annular member bounded by substantially annular edges forming openings of different sizes, and a foil joined to a portion of the edge of the smaller opening; and means securing the area adjacent the edge of the larger opening to said bracket surface; said foil engaging about a portion of bearing boss; said deflector forming with said bracket an inlet chamber for air, said foil forming an entering vestibule for air.

4. In combination: a bearing bracket having a flange for attachment to the frame of a rotary machine, said bracket having a bearing boss as well as an opening on one side of the boss, said bracket also having an annular surface between the end of the flange and the opening; a deflector comprising a generally annular member bounded by substantially annular edges forming openings of different sizes, and a foil joined to a portion of the edge of the smaller opening; said foil having a curved configuration corresponding substantially to the configuration of said smaller opening; and means securing the area adjacent the edge of the larger opening to said bracket surface; said foil engaging about a portion of bearing boss; said deflector forming with said bracket an inlet chamber for air, said foil forming an entering vestibule for air.

5. In combination: a bearing bracket having a bearing boss; and a deflector having an outer edge secured to the interior of the bracket, said deflector having an inner edge, a portion of which engages about a portion of the bearing boss, the remaining portion of said inner edge being free; said bracket having an opening between the engaging portion of said inner edge and the corresponding portion of said outer edge.

6. In combination: a bearing bracket having a bearing boss; and a generally conical deflector having an outer edge secured to the bracket and an inner edge, said deflector having a curved foil joined to a portion of the inner edge and extending inwardly of the deflector, the terminal portion of said foil engaging a portion of the bearing boss; said bracket having an opening between the terminal portion of said foil and the outer edge of said deflector.

7. For use in air ventilated rotary apparatus having a wall providing a bearing support projecting internally of the wall and having an air aperture at one side of the support; a hollow open-ended deflector member having one end interiorly attached to the wall in surrounding relationship both to the support and the aperture for confining air passing through the aperture to a path through the deflector; and an apron having one end joined to the deflector member and extending interiorly of the deflector member toward said one end and tenuating in inwardly spaced relationship with respect to said one end, said apron engaging about a portion of the periphery of the support between the support and the aperture to form a vestibule for air entering the aperture.

References Cited in the file of this patent

UNITED STATES PATENTS

| | | |
|---|---|---|
| 963,845 | Wolf | July 12, 1910 |
| 1,961,387 | Pfleger | June 5, 1934 |
| 2,055,931 | Keely | Sept. 29, 1936 |